(12) United States Patent
Li et al.

(10) Patent No.: US 12,314,336 B2
(45) Date of Patent: May 27, 2025

(54) DYNAMIC VISUAL TAGGING SYSTEM FOR SEARCH

(71) Applicant: Microsoft Technology Licensing, LLC, Redmond, WA (US)

(72) Inventors: Lu Li, Kirkland, WA (US); Huangxing Li, Bellevue, WA (US); Li Huang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/370,924

(22) Filed: Sep. 21, 2023

(65) Prior Publication Data

US 2025/0103666 A1 Mar. 27, 2025

(51) Int. Cl.
  *G06F 16/00* (2019.01)
  *G06F 16/951* (2019.01)
  *G06F 16/9538* (2019.01)

(52) U.S. Cl.
  CPC ........ *G06F 16/9538* (2019.01); *G06F 16/951* (2019.01)

(58) Field of Classification Search
  CPC .......................... G06F 16/9538; G06F 16/951
  See application file for complete search history.

(56) References Cited

U.S. PATENT DOCUMENTS

| | | | |
|---|---|---|---|
| 8,843,477 B1* | 9/2014 | Tirumalareddy | G06F 16/34 707/723 |
| 9,171,088 B2* | 10/2015 | Thakur | G06F 16/951 |
| 10,325,221 B2* | 6/2019 | Bannur | G06N 20/00 |
| 11,281,733 B2* | 3/2022 | Singhal | G06F 16/9574 |
| 11,526,521 B2* | 12/2022 | Diaz | G06F 16/24578 |
| 2017/0192985 A1* | 7/2017 | Fontes | G06F 16/958 |
| 2024/0202202 A1* | 6/2024 | Yudin | G06F 16/9532 |

* cited by examiner

*Primary Examiner* — Debbie M Le
(74) *Attorney, Agent, or Firm* — Cantor Colburn LLP; Renee D. Brown (57) ABSTRACT

Aspects of the disclosure include methods and systems for dynamically creating tagged search results. An exemplary method includes identifying, responsive to receiving a search query, search results. The search results include a plurality of web page links to respective web pages. The method includes identifying, for each web page, one or more page features, generating a plurality of descriptive tags for the respective web pages, generating one or more page-tag pairs by pairing a web page of the respective web pages with a descriptive tag of the plurality of descriptive tags, and determining a relevance score for each page-tag pair. One or more descriptive tags having a relevance score above a predetermined threshold are selected. Tagged search results are provided that include the plurality of web page links and, for each web page link, the selected one or more descriptive tags for the respective web page.

18 Claims, 8 Drawing Sheets

DYNAMIC VISUAL TAGGING SYSTEM FOR SEARCH

INTRODUCTION

The subject disclosure relates to search engines, online search, and search queries, and particularly to a dynamic visual tagging system.

A user search query, often referred to simply as a "search query," is an expression that a user enters into a search interface when seeking information, answers, products, or services. A search query is the specific phrase and/or keywords that users use to articulate their information needs and to initiate a search process. For example, a search query can include a textual expression entered into a search bar, a verbal expression spoken to a search interface of a search engine, and/or a combination of textual and verbal input. Search queries can vary widely in length and complexity, ranging from simple single-word queries like "weather" to more specific and complex queries like "best smartphones under $500 with good camera quality."

When a user provides a search query to a search engine, the search engine's algorithms process the search query and retrieve relevant results that best match the user's search intent. Often, search results include a list of web page links (Uniform Resource Locators or URLs) displayed on a search engine results page (SERP), and the user can browse through and select one or more of the provided links to be directed to an underlying resource (e.g., a webpage) of interest.

Many search engines rely upon a pre-populated URL index, also referred to as a "search index" or "web index," to ensure the retrieval of the most relevant results for a search query. A search index is a large database maintained by (or accessible to) a search engine that contains information about a variety of web pages and their content. The search index serves as a sort of ranked catalog of web pages that have been crawled, analyzed, and indexed by the search engine's web crawlers. The search index contains key information about each indexed page, such as the web page's URL, content (textual data, graphical data, audio data, etc.), metadata, language, location relevance, and other relevant metadata.

When a user enters a search query into a search interface, the search engine can poll (query) the search index to retrieve one or more indexed web page links that match the user's search intent. For example, the search index can be queried to find web pages that contain keyword(s) and context related to the user's query. In some implementations, the search engine will list the retrieved web page links in the SERP by order of their indexed position in the search index.

SUMMARY

Embodiments of the present invention are directed to methods for dynamically creating tagged search results. A non-limiting example method includes identifying, responsive to receiving a search query, search results. The search results include a plurality of web page links to respective web pages. The method includes identifying, for each web page, one or more page features, generating a plurality of descriptive tags for the respective web pages, generating one or more page-tag pairs by pairing a web page of the respective web pages with a descriptive tag of the plurality of descriptive tags, and determining a relevance score for each page-tag pair. One or more descriptive tags having a relevance score above a predetermined threshold are selected. Tagged search results are provided that include the plurality of web page links and, for each web page link, the selected one or more descriptive tags for the respective web page.

In some embodiments, determining the relevance score for each page-tag pair includes leveraging a large language model to output, responsive to receiving an input including a respective page-tag pair, a relevance score.

In some embodiments, determining the relevance score for each page-tag pair further includes training a compact model to generate the relevance scores for each page-tag pair using the output from the large language model.

In some embodiments, identifying, for each web page, one or more page features includes extracting, prior to receiving the search query, the one or more page features from each respective web page, storing the extracted one or more page features in a database, and retrieving, after receiving the search query and from the database, the one or more page features.

In some embodiments, each of the descriptive tags includes an icon associated with a characteristic of the respective descriptive tag.

In some embodiments, the method includes, responsive to a user selecting a descriptive tag of the selected one or more descriptive tags, filtering the tagged search results to include only those web page links having the respective descriptive tag.

In some embodiments, a feature includes one or more of a textual content, a body text, a keyword, a number of images, a number of videos, a type, format, or dimension of an image or video, and a layout of text, images, or videos in a respective web page.

In some embodiments, the plurality of descriptive tags include one or more of an Image-Rich tag, a Video Content tag, a Scientific Facts tag, a Photography tag, a Scenic tag, a Recipes tag, a Kid Friendly tag, a Stories tag, and a Creative tag.

In some embodiments, the plurality of descriptive tags further include one or more user-defined tags.

In some embodiments, generating the one or more page-tag pairs further includes generating, for each respective web page, one or more feature-tag pairs.

Embodiments of the present invention are directed to systems for dynamically creating tagged search results. A non-limiting example system includes a user interface having a search bar. The user interface is configured to display a search engine results page (SERP) responsive to receiving, in the search bar, a search query. The SERP includes search results including one or more web page links to respective web pages. The system includes a compact model configured to modify the SERP, responsive to receiving the search results and a plurality of descriptive tags for the respective web pages, to include tagged search results. The tagged search results include, for each respective web page link in the search results, one or more descriptive tags of the plurality of descriptive tags. The one or more descriptive tags can be selected, within the user interface, to filter the one or more web pages links in the SERP In some embodiments, the compact model is trained to determine a relevance score for a page-tag pair including a web page of the respective web pages and a descriptive tag of the plurality of descriptive tags.

In some embodiments, the system includes a large language model configured to output relevance scores for a page-tag pairs.

In some embodiments, training the compact model to determine the relevance score for the page-tag pair includes training the compact model to approximate a relevance score output from the large language model.

In some embodiments, modifying the SERP to include the tagged search results includes selecting the N descriptive tags of the plurality of descriptive tags having the highest relevance scores.

In some embodiments, responsive to N being greater than a predetermined limit, the compact model is configured to truncate N to a number below the predetermined limit.

In some embodiments, selecting a descriptive tag causes the SERP to include only those web pages links associated with the respective descriptive tag.

In some embodiments, the plurality of descriptive tags include one or more of an Image-Rich tag, a Video Content tag, a Scientific Facts tag, a Photography tag, a Scenic tag, a Recipes tag, a Kid Friendly tag, a Stories tag, and a Creative tag.

In some embodiments, the plurality of descriptive tags further include one or more user-defined tags.

In some embodiments, the system includes a database configured to store one or more page features extracted from the respective web pages.

Embodiments of the present invention are directed to systems for dynamically creating tagged search results. A non-limiting example system includes a compact model trained to modify a SERP to include, for each web page link in the SERP, one or more visual tags. A user interface is configured to display the one or more visual tags. The user interface is further configured to receive a description of a desired tag. The system further includes a memory, computer readable instructions, and one or more processors for executing the computer readable instructions, the computer readable instructions controlling the one or more processors to perform operations. The operations include inputting, to the compact model, the description of the desired tag, receiving, as output from the compact model, a new visual tag, and adding the new visual tag to the displayed one or more visual tags.

In some embodiments, the system includes a generative model. In some embodiments, the operations further include providing at least one of the new visual tag and the description of the desired tag as input to the generative model, and receiving, as output from the generative model, an image for the new visual tag.

In some embodiments, the operations further include identifying, for one or more web pages, one or more page features, and determining, for each of the one or more web pages, a relevance score for the new visual tag using the one or more page features.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

Search engines are widely used for a variety of purposes, such as general information retrieval, web browsing, product research, accessing news, entertainment, and academic/professional research. The search index is the backbone of a search engine's ability to deliver accurate and relevant search results to users. When a user enters a search query into a search engine via a search interface, the search engine can poll (query) the search index to retrieve one or more indexed web page links that match the user's search intent. The search engine can then list the retrieved web page links in a search engine results page (SERP). To ensure accurate, helpful search results in the SERP, the search engine's algorithms can be designed to identify one or more relevant web pages in the search index that contain content and metadata (stored in the search index with the respective web page) matching the search query's keyword(s) and/or context.

Many search engines descriptively rank search results in a SERP based on predesigned rankers that were themselves built up based on mass user data. For example, rankers can be configured to rank web pages using predefined methodologies, such as page-query relevance, page quality, and click rate. Unfortunately, in most implementations, users can only browse through the resultant list of ranked search results within the SERP when attempting to find a particular resource(s) of interest. In other words, a user must largely rely upon the SERP's underlying ranking methodology (for example, rankings determined by the predesigned rankers) for web page links to find the links that they are interested in, without having the ability to incorporate their own preferences in the ranking results. Efforts have been made to personalize ranking experiences, such as by leveraging user engagement histories to adjust web page rankings, but these efforts are somewhat limited in their ability to consider users' changing preferences in search activities and cannot account for the specific, one-time preferences of a single search session.

This disclosure introduces a dynamic visual tagging system for an enhanced search experience. Rather than relying solely on predesigned rankers and/or other underlying methodologies for ordering search results in a SERP, aspects of the present disclosure dynamically append a descriptive visual tag to one or more search results. In some embodiments, each visual tag graphically represents one or more characteristics of the respective search result. For example, the tags can be used to indicate page content (recipes, instructions, story, etc.), whether or not the content is kid-friendly, whether the content is image-rich, contains scientific facts, etc.

In some embodiments, each tag is clickable and/or otherwise selectable by a user, and upon clicking (or selecting, gesturing to, etc.) a tag, the search results will be filtered or ordered based on the characteristics of the tag that was clicked. For example, if a user wants to see web pages with many images, the user could click the tag for "image-rich" to filter the SERP to only include those web pages having the "image-rich" tag. In this manner, the tags can be used cooperatively with the underlying rankers to provide a user-directed, fully personalized search experience.

Dynamically tagging search results (for example, web pages) with tags and allowing users to interact with those tags as described herein solves a number of somewhat related technical limitations with current search and indexing systems. In particular, previous search engines are largely limited by their SERP's underlying ranking methodology. In contrast to the design of existing search engines, the present approach introduces an additional layer of processing to assign tags to the search results that can be used, by the user, to personalize their search beyond what is available using rankers alone. Moreover, while even sophisticated rankers trained to predict user intent during a search interaction cannot account for the specific, one-time preferences of a single search session, the use of dynamic, user-interactable tags natively provides this functionality-users can interact with the tags directly within a seamless, straightforward process to uniquely guide each search session. To illustrate, consider a user that consistently prefers results having the "image-rich" tag, but that wants, for a particular search session (perhaps for a research paper), scientifically dense results without images. In this scenario, the user can guide the search session to those results having "no images" tags and/or "scientific facts" tags. This is simply not possible with predefined rankers (even dynamically learning rankers), which, if built to learn from user engagement histories, would populate this user's SERP with image-rich web pages. Other advantages are possible.

For example, a dynamic visual tagging system configured as described herein could be used to help users quickly identify pages of potential interest by allowing the users to simply glance through various descriptive visual tags and predict, aided by the tags, what they would expect after clicking the respective links. Moreover, users can re-rank the search results in a SERP in real-time in a natural manner by simply clicking on one or more tags.

In some embodiments, users can even personalize their search interests by adding their own tags. The incorporation of user-defined tags offers an opportunity to gain valuable insights into user behavior. For example, the user-defined tags can be studied to enhance the native, underlying search engine, for example, by modifying the ranking and/or selection of tags, improving the overall search experience for all users. This data-driven approach not only benefits individual users by delivering more relevant search results but also enables the refinement of search algorithms based on user preferences and behaviors.

Figure 1:
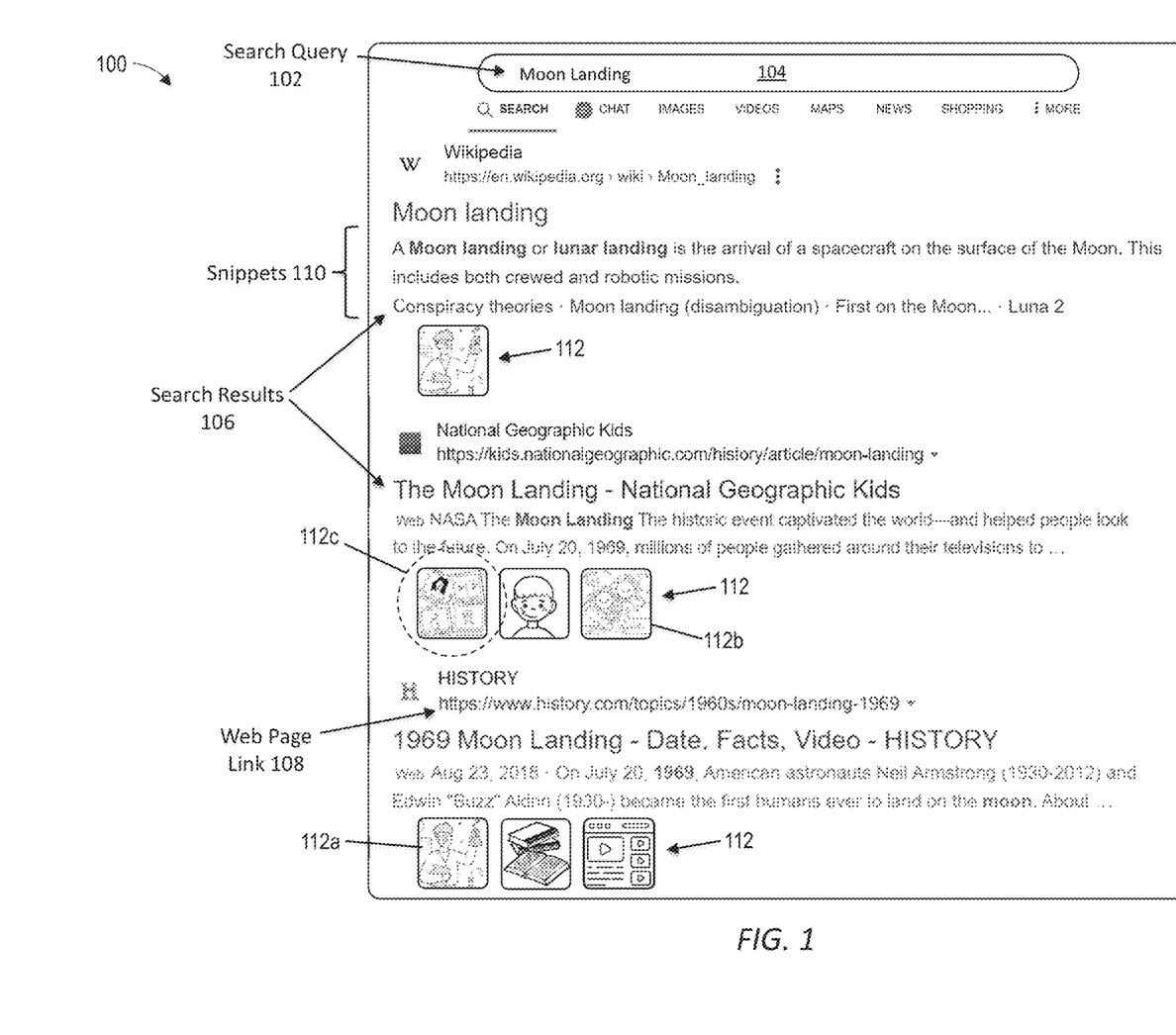
FIG. 1 depicts an example search engine results page (SERP) in accordance with one or more embodiments.

FIG. 1 depicts an example SERP 100 in accordance with one or more embodiments of the present invention. The SERP 100 can be presented to a user in a user interface of a computer system (e.g., the computer system 700 in FIG. 7). In some embodiments, the SERP 100 can be presented to a user in response to receiving, from the user, a search query 102 (here, the text "Moon Landing"). In some embodiments, the user provides the search query 102 via a search bar 104 of a search engine (not separately shown), which can itself define part of the user interface.

As shown in FIG. 1, the SERP 100 includes one or more search results 106. While not meant to be particularly limited, the search results 106 can include various web page links 108 and associated snippets 110 (also referred to as teasers or synopses) relevant to the search query 102. In some embodiments, the search results 106 and/or the web page links 108 are fetched or generated using one or more predefined rankers and/or a search index (not separately shown), as described previously. However populated, the search results 106 point to underlying resources (web pages) having a wide range of characteristics. For example, the web pages can vary in content, each offering some combination of stories, scientific facts, recipes, content with videos, social media content, news articles, etc. Beyond content variations, the web pages can also vary in implementation and/or presentation. For example, the web pages can exhibit diverse styles, ranging from predominantly textual content with technical and/or scientific language to simple elementary introductions with colorful illustrations to photography resources rich in images. Observe that, without clicking on each individual web page link 108, a user would find it challenging to discern these differences in content and characteristics.

Figure 3:
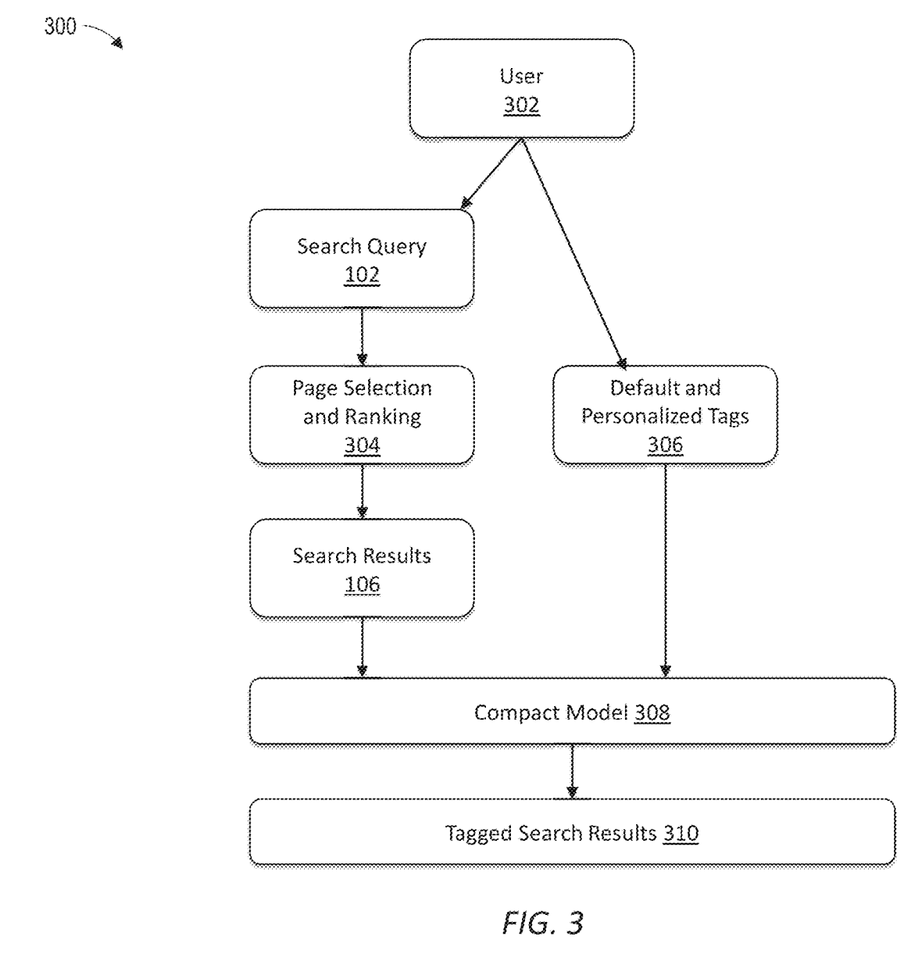
FIG. 3 illustrates a block diagram of an example architecture for dynamically building tagged search results in accordance with one or more embodiments.

In some embodiments, one or more of the search results 106 are modified to include one or more descriptive, visual tags 112. In some embodiments, the tags 112 serve as a visual indicator of the content and/or characteristics of a respective one of the search results 106. The modified search results can be referred to as tagged search results. An example architecture for dynamically creating tagged search results is discussed in greater detail with respect to FIG. 3. An example dynamic visual tagging system for implementing the architecture of FIG. 3 is discussed in greater detail with respect to FIG. 4.

In some embodiments, each of the tags 112 includes an image or icon uniquely associated with one or more predetermined or user-defined characteristics (referred to herein as the tag type). For example, the tag 112a can visually represent the characteristic "Scientific Facts" and can include an icon of a scientist doing an experiment. For another example, the tag 112b representing the characteristic "Creative" can include an icon depicting a scene or collage of illustrations. For yet another example, the tag 112c representing the characteristic "Image-Rich" can include an icon depicting a collection of photographs. The tags 112 can be associated with any desired concept, such as "Image-Rich", "Video Content", "Scientific Facts", "Photography", "Scenic", "Recipes", "Kid Friendly", "Stories", and "Creative", although other tag types are possible and all such configurations are within the contemplated scope of this disclosure.

By providing the different types of tags 112 with unique icons and/or images, users can easily, by simply glancing at the tags 112, determine the general content and/or characteristics of the web page links 108 without needing to actually visit those pages. This allows the user to visually prioritize web page links 108 (or other resources) having specific content and/or characteristics of interest, allowing users to more quickly find satisfactory search results.

In some embodiments, the tags 112 are interactive widgets that can be selected, clicked, and/or otherwise accessed within the user interface. In some embodiments, selecting one of the tags 112 can cause the search results 106 to be filtered to prioritize web page links 108 having the selected tag (refer to FIG. 2). For example, if a user wants to focus on resources having many images, the user could click (represented by the dashed circle) the tag 112c associated with the characteristic "Image-Rich" to focus the search results 106 to those web page links 108 having the "Image-Rich" tag 112c. In this manner, a personalized ranking experience is provided whereby the user can leverage the tags 112 to quickly refine and filter the search results 106.

Figure 2:
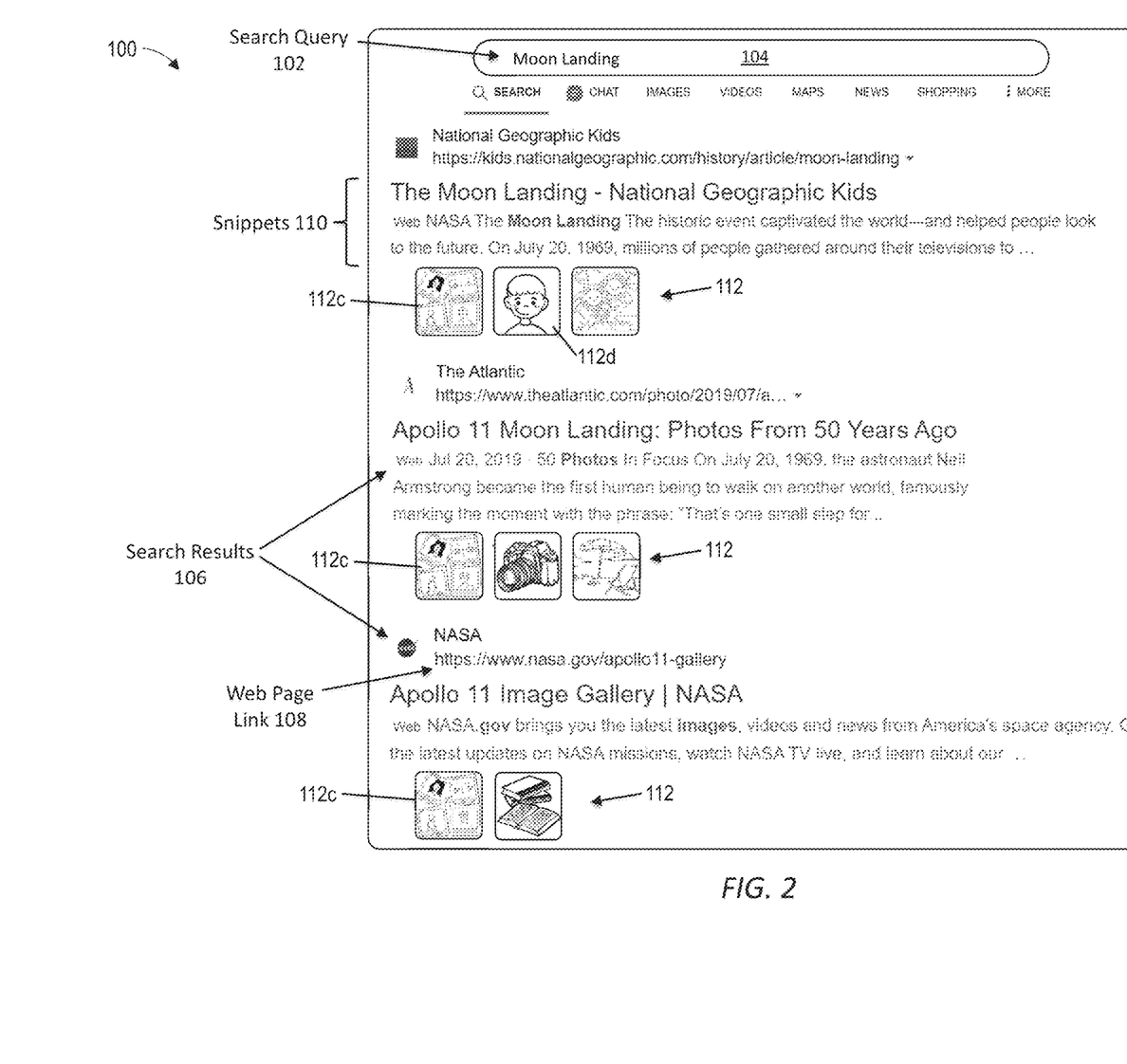
FIG. 2 depicts the SERP in FIG. 1 after a user selects a tag in accordance with one or more embodiments.

FIG. 2 depicts the SERP 100 in FIG. 1 after a user selects the tag 112c in accordance with one or more embodiments of the present invention. As shown in FIG. 2, the SERP 100 has been filtered to prioritize web page links 108 having the "Image-Rich" tag 112c. Observe, in particular, that while the search query 102 has not changed (for example, a query for "Moon Landing"), the search results 106 have been largely reordered and filtered. For example, the search results 106 now place the web page "The Moon Landing-National Geographic Kids" as the topmost resource, and includes new web page links 108 not previously shown (here, links to "Apollo 11 Moon Landing: Photos From 50 Years Ago" and "Apollo 11 Image Gallery|NASA"). In addition, previously highly ranked resources, such as the "Moon landing" Wikipedia entry, are no longer displayed and/or are de-prioritized.

While omitted for simplicity, it should be understood that the user can continue to refine and filter the search results 106 by successively selecting one or more additional tags 112. For example, selecting an additional tag 112d for "Kid Friendly" will cause the search results 106 to be further filtered to include only those (or otherwise prioritize) resources matching both the "Image-Rich" tag 112 previously provided as well as the new "Kid Friendly" tag 112d.

FIG. 3 illustrates a block diagram of an example architecture 300 for dynamically building tagged search results in accordance with one or more embodiments. As shown in FIG. 3, the architecture 300 begins when a user 302 initializes a search interaction, for example, as a result of the user 302 navigating and/or otherwise accessing a search page (or search engine).

In some embodiments, the user 302 enters or otherwise provides the search page with a search query 102. In some embodiments, the user 302 can provide the search query 102 as text entered into a search bar (e.g., the search bar 104 of FIGS. 1 and 2). For example, the user 302 might provide the text "Moon Landing" for the search query 102.

In some embodiments, page selection and ranking 304 is triggered in response to receiving the search query 102. Page selection and ranking 304 culminates in the generation of search results 106, which can be provided to the user within the user interface used to provide the search query 102. The particular implementation of the page selection and ranking 304 process for providing the search results 106 is not meant to be particularly limited, but can include, for example, querying a search index to find one or more web pages that contain keyword(s) and/or context related to the search query 102 and/or leveraging rankers to rank web pages according to predefined methodologies, such as page-query relevance, page quality, and click rate. In some embodiments, the search index includes an ordered list (index, ranking) of a plurality of web pages. In some embodiments, the search results 106 returned as a result of page selection and ranking 304 includes a list of web page links 108 sorted in order of their relative ranking (for example, their indexed position) within the search index.

In some embodiments, the search results 106 are provided, with one or more default and/or personalized tags (collectively, the default and personalized tags 306), as inputs to a compact model 308. In some embodiments, the default and personalized tags 306 include one or more default tags. In some embodiments, each of the default tags includes an image or icon uniquely associated with one or more predetermined characteristics. For example, a default tag can visually represent the characteristic "Scientific Facts" and can include an icon of a scientist doing an experiment. In some embodiments, the default and personalized tags 306 include one or more personalized tags. In some embodiments, each of the personalized tags includes an image or icon uniquely associated with one or more user-defined characteristics. The creation of personalized tags is discussed in greater detail with respect to FIGS. 6A and 6B.

In some embodiments, the compact model 308 is trained to generate an output including tagged search results 310 from the search results 106 and the default and personalized tags 306. In some embodiments, the tagged search results 310 are constructed by modifying the search results 106 to include one or more descriptive, visual tags 112 as described previously. For example, each web page link 108 of the tagged search results 310 can be accompanied by one or more tags 112 to serve as a visual indicator of the underlying content and/or characteristics of the respective web page (refer to FIGS. 1 and 2). In some embodiments, the compact model 308 is trained to identify one or more appropriate tags for each respective web page link 108. In some embodiments, the compact model 308 is a language model trained to evaluate the degree of alignment between a tag and the page content of a respective web page. The configuration and training of the compact model 308 is discussed in greater detail with respect to FIG. 4.

Figure 4:
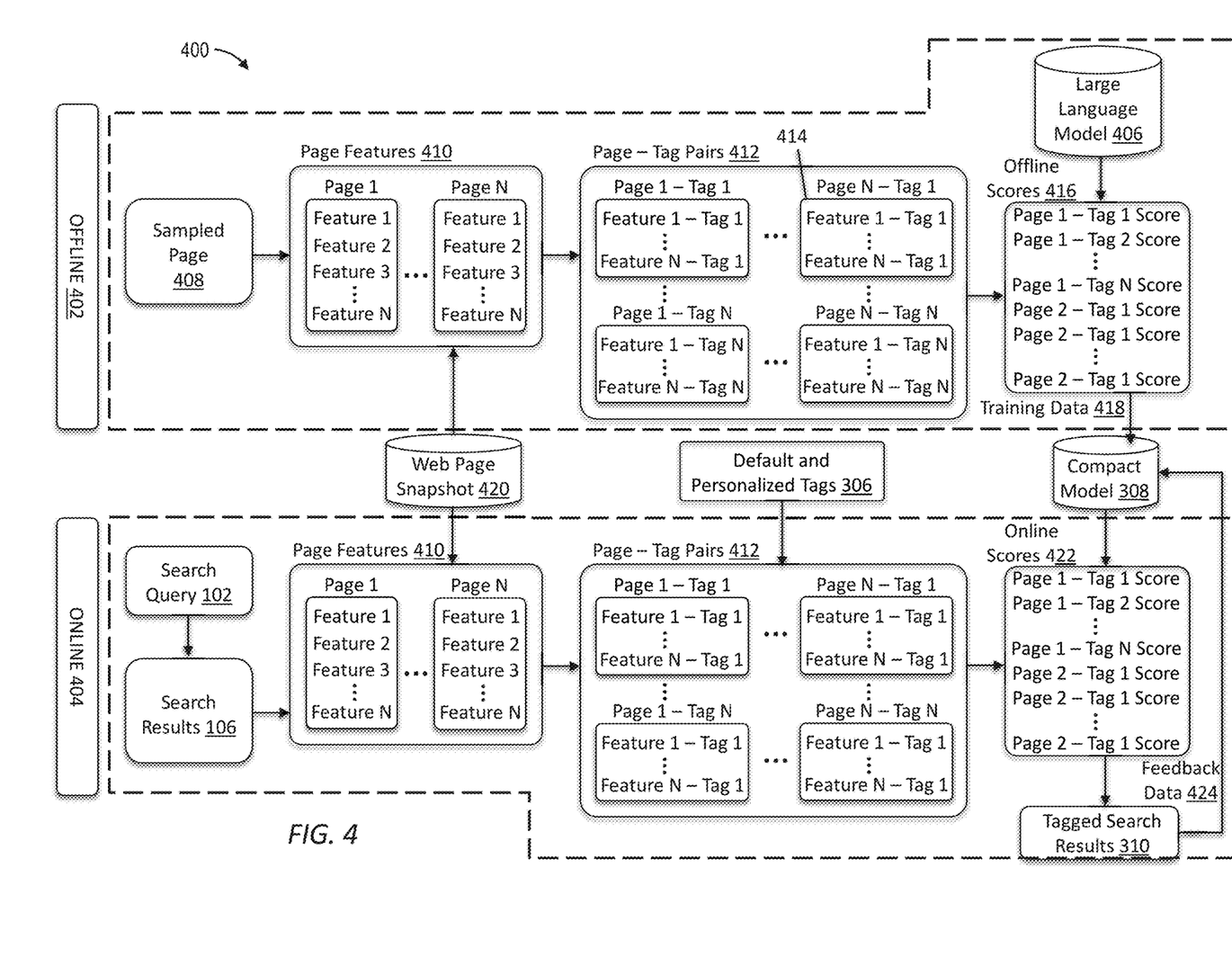
FIG. 4 depicts a block diagram for a dynamic visual tagging system in accordance with one or more embodiments.

FIG. 4 illustrates a block diagram of an example dynamic visual tagging system 400 for dynamically building tagged search results in accordance with one or more embodiments. As shown in FIG. 4, the dynamic visual tagging system 400 includes an offline portion 402 and an online portion 404. The offline portion 402 generally involves leveraging a large language model 406 to train a lightweight language model, referred to herein as the compact model 308, to apply tags 112 to web pages (for example, to provide tagged search results 310). The online portion 404 generally involves leveraging the trained compact model 308 to dynamically tag web pages responsive to receiving a search query 102. Note that the compact model 308 is trained during the offline portion 402 and used during the online portion 404, and so sits between the offline portion 402 and the online portion 404.

Turning now to the online portion 402, a corpus of training data is sourced and/or otherwise collected. In some embodiments, the corpus of training data can include a sampled page 408. In some embodiments, an arbitrary number (for example, ten, one hundred, one thousand, one million, tens of millions, etc.) of sampled web pages and their features are collected from a preexisting resource, such as from crawled web page data. In an example, a "feature"

of a web page means the technical attributes, elements, content, and characteristics of a web page. A feature of a web page can include, for example, the textual content of the web page, such as the body text, keywords, etc., non-textual content, such as the number of images and/or videos in the web page, the type, format, and dimensions of the image and video data, the arrangement or layout of the text, images, and/or videos in the web page, etc., contextual metadata for the web page, such as being related to a birthday party, vacations, the workplace, skiing, etc., web page metadata, such as the host identifier for the web page, its domain, the structure and format of the respective URL, etc., parent link metadata, such as the parent's host identifier, popularity, rank in the respective search index, page authority as evidenced by number and quality of incoming links, etc., the presence and quality of internal links (links within the same website) and external links (links to other websites), usability metrics, such as page load speed, mobile compatibility, and the availability of accessibility features, security metrics, such as the use of HTTPS encryption, user engagement metrics, such as a click-through rate (CTR), bounce rate, and time spent on the web page, the frequency of content updates, and the time since the last update.

In some embodiments, one or more page features 410 are identified for each sampled page 408. For example, a first page "Page 1" might be associated with one or more features "Feature 1", "Feature 2" . . . "Feature N". Continuing with this example, the first page might have the features: "image of dog", "video of dog playing fetch", "text data describing dogs and their training", etc. This process can be repeated for any number of sampled pages 408 (as shown, for the pages "1" to "N"). In some embodiments, the page features 410 are retrieved from a database (here, the web page snapshot 420), for each sampled page 408. For example, the web page snapshot 420 can include, for each sampled page 408, a description of the body text, any keywords, the number of images, image dimensions, etc. In some embodiments, the page features 410 are manually labeled using, for example, subject matter experts. In some embodiments, the page features 410 are labeled automatically using, for example, the large language model 406. For example, the large language model 406 can be asked to identify and/or quantify the N most prominent features of the respective sampled page 408 and/or can be asked to determine whether any particular, predetermined feature is present in the sampled page 408.

In some embodiments, page-tag pairs 412 can be created for one or more (all) unique combinations of sampled pages 408 and tags 112. For example, page-tag pairs 412 for the pages "Page 1" to "Page N" and tags "Tag 1" to "Tag N" can be created for Page 1-Tag 1, Page 1-Tag 2, . . . , Page 1-Tag N, for Page 2-Tag 1, Page 2-Tag 2, . . . , Page 2-Tag N, and for Page N-Tag 1, Page N-Tag 2, . . . , Page N-Tag N. In some embodiments, the tags 112 are predefined labels, such as, for example, "Image-Rich", "Kid Friendly", "Scientific", "Stories", etc., as described previously.

In some embodiments, each of the page-tag pairs 412 is further described using one or more feature-tag pairs 414. In some embodiments, feature-tag pairs 414 can be created for one or more (all) unique combinations of features and tags 112 for each respective sampled page 408. For example, feature-tag pairs 414 for the page "Page 1" can be created for Feature 1-Tag 1, Feature 2-Tag 1, . . . , Feature N-Tag 1, Feature 1-Tag 2, Feature 2-Tag 2, . . . , Feature N-Tag 2, . . . , Feature 1-Tag N, Feature 2-Tag N, . . . , Feature N-Tag N. Similar feature-tag pairs 414 can be created for the remaining pages (for example, "Page 2" . . . "Page N").

In some embodiments, a large language model 406 is leveraged to evaluate a relevance score, also referred to as a matching score, a page-tag score, and/or as an offline score 416, between each of the page-tag pairs 412. In some embodiments, the large language model 406 is leveraged to evaluate the offline score 416 using the page features 410, the tags 112, and/or the feature-tag pairs 414 as input.

While not meant to be particularly limited, the large language model 406 can include a neural network architecture specifically designed for natural language processing (NLP) tasks. Large language models are generally characterized by their immense size, often containing hundreds of millions or even billions of parameters. Alternatively, or in addition, the large language model 406 can include a large foundational model architecture. Large foundational models, sometimes referred to as "base models" serve as the underlying foundation for building specialized models for specific tasks. Foundational models are typically pre-trained on extensive and diverse datasets to learn general language understanding and representations, but are usually not tailored to any particular application. Instead, large foundational models are designed to capture broad linguistic patterns and knowledge. Once pre-trained, large foundational models can be fine-tuned on smaller, task-specific datasets to adapt them, for example, to specific NLP tasks.

Regardless of the underlying architecture, the large language model 406 can be trained or pre-trained on a relatively large amounts of training data, such as text data, including books, articles, and websites, using any combination of unsupervised and supervised learning techniques. One of the most successful architectures for large language models is the transformer, which utilizes a self-attention mechanism to capture contextual information and relationships between words in text, but the large language model 406 is not meant to be limited to transformer-based architectures. Other architectures, such as recurrent neural networks, are possible, and all such configurations are within the contemplated scope of this disclosure.

In some embodiments, the offline scores 416 generated by the large language model 406 are themselves leveraged as labeled training data 418 for the compact model 308. In this manner, a large, computationally expensive and relatively complex language model (the large language model 406) can be leveraged to train a relatively lightweight language model (the compact model 308) to predict page-tag scores without the compute overhead associated with the large language model, reducing latency (for example, response time from search query 102) and processing costs. To illustrate, the large language model 406 might be a large transformer-based generative model having 78 transformer layers, a hidden size of 4256, and 28 attention heads, while the compact model 308 might be a neural network having only 2 hidden layers.

In some embodiments, the compact model 308 is built using less than 25 percent the number of layers of the large language model 406 (e.g., for a large transformer-based generative model having 78 transformer layers the compact model 308 will include 19 or fewer hidden layers). In some embodiments, the compact model 308 is built using less than 10 percent the number of layers of the large language model 406 (e.g., for a large transformer-based generative model having 78 transformer layers the compact model 308 will include 7 or fewer hidden layers). In some embodiments, the compact model 308 is built using less than 5 percent the number of layers of the large language model 406 (e.g., for a large transformer-based generative model having 78 transformer layers the compact model 308 will include 3 or fewer hidden layers). In some embodiments, the compact model 308 is built using less than 3 percent the number of layers of the large language model 406 (e.g., for a large transformer-based generative model having 78 transformer layers the compact model 104 will include 1 or 2 hidden layers).

The exact configuration (e.g., transformer, RNN, etc.) and complexity (e.g., number of layers) of the large language model 406 and the compact model 308 are not meant to be particularly limited, and all such configurations of a first, relatively complex model and a second, relatively less complex model are within the contemplated scope of this disclosure.

In some embodiments, the labeled training data 418 includes a 3-tuple <$P_i$, $T_i$, SCORE> generated for each page i, tag i, and associated page-tag score. In some embodiments, the generated 3-tuples for each respective page-tag score define the labeled training data 418.

In some embodiments, the generated 3-tuples are used to build the compact model 308 using a contrastive learning approach. In essence, contrastive learning involves training the compact model 308 to match the soft labels (scores) of the offline scores 416 previously derived using the large language model 406.

In some embodiments, the compact model 308 is initialized by setting, manually or randomly, the weights of the various hidden nodes of the hidden layers (not separately shown) to some initial value(s). In some embodiments, the weights of the various hidden nodes are initialized using prior weights taken, for example, from a similar and/or prior model. In some embodiments, the weights of the various hidden nodes are initialized to the same value, or alternatively, to different values.

In some embodiments, the compact model 308 is trained (that is, the weights of the hidden nodes are determined) by adjusting one or more weights of the hidden nodes until an output from the compact model 308 matches, within any desired tolerance, the known score of the respective 3-tuple provided by the large language model 406. In short, the known scores for each 3-tuple serve as a ground truth against which the internal weights of the compact model 308 can be trained. Continuing with this scenario, one or more (possibly all) weights of the hidden nodes can be adjusted until the outputs for a plurality of input 3-tuples agree with the known ground truths.

The compact model 308 can be trained in this manner using one or more of a variety of techniques, such as, for example, by a stochastic gradient descent (SGD) approach in combination with the use of an objective function over a set of 3-tuples to achieve a desired level of accuracy. That is, the compact model 308 can be trained on an arbitrarily large set of training data (3-tuples of the offline scores 416) until agreement with the known ground truths reaches a predetermined degree of accuracy. In other words, the weights can be adjusted until the compact model 308 generates page-tag scores that approximate the scores generated by the large language model 406. The particular degree of accuracy enforced during training is not meant to be particularly limited, but may include, for example, a prediction accuracy of at least 50 percent, at least 75 percent, at least 90 percent, at least 95 percent, at least 98 percent, at least 99 percent, etc.

In some embodiments, the compact model 308, once trained to score page-tag pairs, can be leveraged to dynamically tag one or more web pages during the online portion 404. Dynamic tagging is discussed in greater detail with respect to the online portion 404.

Turning now to the online portion 404, a search query 102 can be received, for example, by a user providing the text "Moon Landing" via a search bar 104 (refer to FIG. 1). In some embodiments, search results 106 are generated responsive to the search query 102. The search results 106 can be generated as described previously with respect to FIGS. 1-3.

For example, in some embodiments, once a user inputs a search query 102 into the search engine (for example, a component and/or user interface of the dynamic visual tagging system 400 and/or an external component and/or user interface used in combination with the dynamic visual tagging system 400), the search query 102 is parsed, analyzed, and processed. The search engine can then refer to an extensive indexing system to identify and retrieve pages that correspond to the search query 102. The retrieved pages can be filtered and ranked, for example, by predefined rankers, according to various criteria such as page quality, click data, page layout, the user's region, language, and search history, as described previously.

In some embodiments, page features 410 for the selected and ranked web pages of the search results 106 are retrieved from a database (here, the "web page snapshot 420), as described previously, except that the page features 410 retrieved during the online portion 404 are specifically directed to the selected and ranked web pages of the search results 106. In some embodiments, the page features 410 used during the online portion 404 align with those page features 410 used during the offline portion 402. For example, the page features 410 used during the online portion 404 and the offline portion 402 can include the same features.

In some embodiments, page-tag pairs 412 can be created for one or more (all) unique combinations of the selected and ranked web pages of the search results 106 and the tags 112, in a similar manner as described with respect to the offline portion 402 for the sampled pages 408 and tags 112. In some embodiments, the tags 412 can include the default and personalized tags 306.

In some embodiments, the compact model 308 is leveraged to evaluate a relevance score, or "page-tag score", referred to herein as an online score 422, between each of the page-tag pairs 412 of the online portion 404, in a similar manner as described with respect to the offline scores 416 generated by the large language model 406 during the offline portion 402.

In some embodiments, the online scores 422 are leveraged to identify one or more appropriate tags 112 for each respective web page link 108 in the search results 106. For example, the N highest scoring tags 112 can be identified as appropriate tags 112 (for example, the 1, 3, 6, etc. highest scoring tags), or the N tags 112 having a score above a predetermined threshold (for example, a score of at least ⅘, 75%, etc.). In some embodiments, if the number of qualifying tags is greater than a predetermined limit, the number of tags can be truncated to a set amount, such as 3, 5, etc., as desired.

In some embodiments, the selected tags 112 are graphically displayed alongside and/or otherwise attached to the respective web page links 108 of the search results 106, defining tagged search results 310 within an output SERP (e.g., the SERP 100). An example of search results 106 modified to include tags 112 is shown in FIGS. 1 and 2.

In some embodiments, user interactions with the selected tags 112, the web page links 108 of the search results 106, and/or the tagged search results 310 are used as feedback data 424 for fine-tuning the compact model 308. Methods for fine tuning models are known and are not meant to be particularly limited, but can include, for example, adjusting the weights of the compact model 308 when the scores for a respective tag does not accurately predict, within any predetermined threshold, user engagement with the respective tag.

Figure 5:
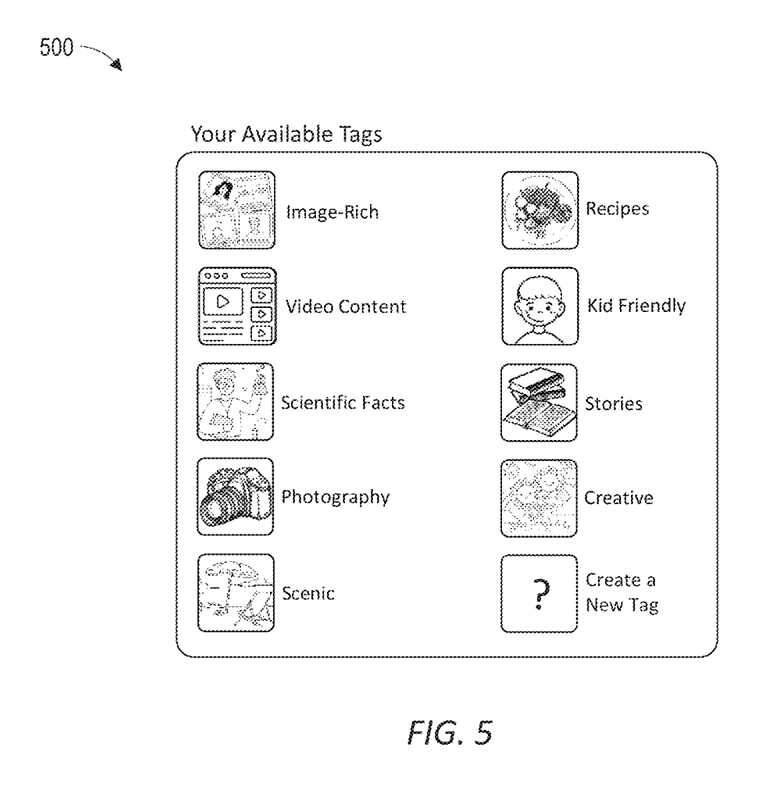
FIG. 5 depicts an example tag list in accordance with one or more embodiments.

FIG. 5 depicts an example tag list 500 in accordance with one or more embodiments of the present invention. In some embodiments, the tag list 500 includes one or more predefined tags 112. As shown, the predefined tags 112 include "Image-Rich", "Video Content", "Scientific Facts", "Photography", "Scenic", "Recipes", "Kid Friendly", "Stories", and "Creative", although other tag types are possible and all such configurations are within the contemplated scope of this disclosure.

In some embodiments, an instance of the tag list 500 can be assigned to each user. In some embodiments, the tag list 500 can be personalized by each user. For example, a user can, via user interactions such as clicking an "X" widget (not separately shown), delete any of the tags 112 shown in their respective implementation of the tag list 500. Similarly, in some embodiments, the tag list 500 includes an option for generating one or more new tags (here, the icon for "Create a New Tag").

In some embodiments, the predefined tags 112 in the tag list 500 serve as a sort of baseline for the respective user, and, as the user becomes more acquainted with the dynamic visual tagging system 400, the user can use the predefined tags 112 as a reference for creating their own personalized tags based on their own specific interests. In some embodiments, selecting and/or otherwise interacting with the "new tag" icon directs the user to a personalized tag creation session, described in more detail with respect to FIGS. 6A and 6B.

Figure 6A:
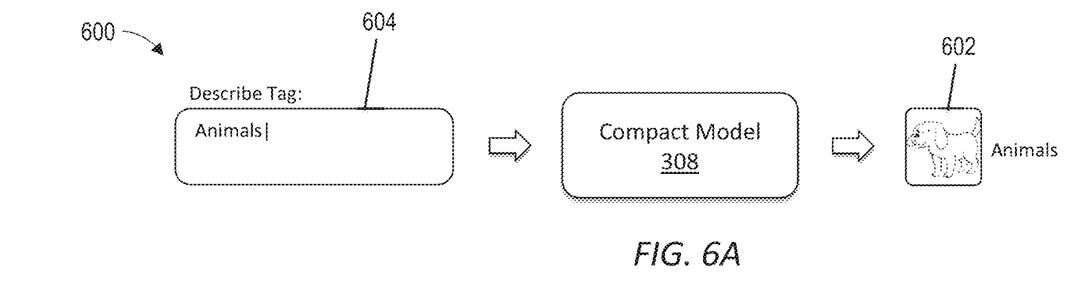
FIG. 6A depicts an example process for creating a user-defined tag in accordance with one or more embodiments.
Figure 6B:
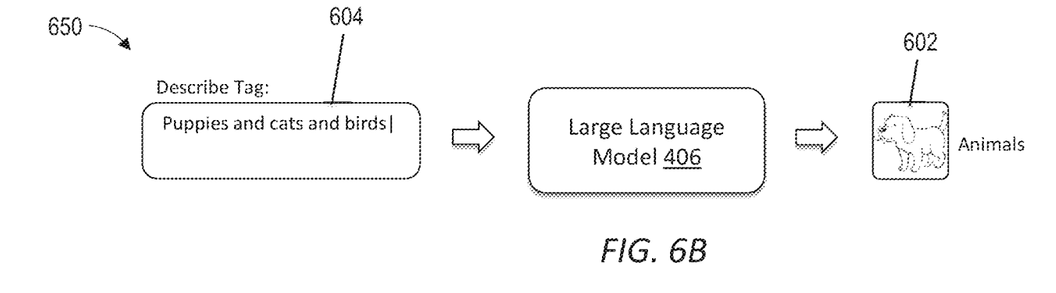
FIG. 6B depicts another example process for creating a user-defined tag in accordance with one or more embodiments.

FIG. 6A depicts an example process 600 for creating a user-defined tag in accordance with one or more embodiments of the present invention. FIG. 6B depicts another example process 650 for creating a user-defined tag in accordance with one or more embodiments of the present invention.

As described previously, in some embodiments, a user can select and/or otherwise interact with a "new tag" icon within a tag list 500 to direct the user to a personalized tag creation session (for example, to the process 600 of FIG. 6A and/or the process 650 of FIG. 6B).

As shown in FIG. 6A, in some embodiments, the compact model 308 can be leveraged to create a user-defined tag 602. In some embodiments, the user is presented with an interface, such as a chat dialog box 604, for providing a description of the desired tag. For example, the user might enter the text "Animals" into the chat dialog box 604. In some embodiments, the compact model 308 receives, as input, the text input into the chat dialog box 604. In some embodiments, the compact model 308 provides, as output, the user-defined tag 602. Note that, while the compact model 308 has been trained to understand and score web page-tag pairs, the compact model 308 is a relatively simple model, and therefore the ability to freely interpret the text input into the chat dialog box 604 is somewhat constrained. In some embodiments, the text input into the chat dialog box 604 is limited to one or only a few words to ensure interpretability by the compact model 308.

In some embodiments, the compact model 308 can leverage an external, generative model (not separately shown) to provide an image (or a suite of possible images for selection by the user) relevant to the new user-defined tag 602. For example, a new user-defined tag 602 for "Animals" can be provided an image of a dog, or puppy (as shown). Additionally, or alternatively, the user can provide their own images for the user-defined tag 602.

As shown in FIG. 6B, in some embodiments, the large language model 406 can be leveraged to create the user-defined tag 602. In some embodiments, the user is presented with an interface, such as a chat dialog box 604, for providing a description of the desired tag, in a similar manner as described with respect to FIG. 6A. However, unlike the compact model 308, the large language model 406 retains full interpretive capabilities for text entered into the chat dialog box 604. Accordingly, the user is less (or not) restricted in the scope and/or breadth of the text input into the chat dialog box 604. To illustrate, while the text provided with respect to the compact model 308 (refer to FIG. 6A) was the simple term "Animals", the text input into the chat dialog box 604 for the large language model 406 is the relatively more complex phrase, "Puppies and cats and birds". Advantageously, the large language model 406 can interpret what is meant by the text, and can output, as a response, the user-defined tag 602.

While the processes 600 and 650 are shown separately for ease of discussion and illustration, the processes 600 and 650 can be combined within a single workflow. In some embodiments, selection of the compact model 308 and/or the large language model 406 for generating the user-defined tag 602 can be a function of the complexity of the text input into the chat dialog box 604. For example, short, single or few (2-3) word inputs can be directed to the compact model 308, while longer inputs can be directed to the large language model 406.

Furthermore, while the processes 600 and 650 are shown as requiring only a single iteration (that is, the resultant user-defined tag 602 is acceptable to the user) for ease of illustration and discussion, in some embodiments, the user can continue interacting with the compact model 308 and/or the large language model 406, via the chat dialog box 604, to refine and/or replace the user-defined tag 602 until the user is fully satisfied with the results.

In some embodiments, generating the user-defined tag 602 (via either or both of the processes 600 and 650) results in adding the user-defined tag 602 to a tag list (e.g., the example tag list 500 in FIG. 5). In some embodiments, adding a new user-defined tag 602 causes a dynamic visual tagging system (e.g., the example dynamic visual tagging system 400 of FIG. 4) to determine, for one or more web pages, a relevance score for the user-defined tag 602 as described previously. In this manner, visual tags 112 for the new user-defined tag 602 can be provided for one or more web page links 108 (refer to FIGS. 1 and 2).

Figure 7:
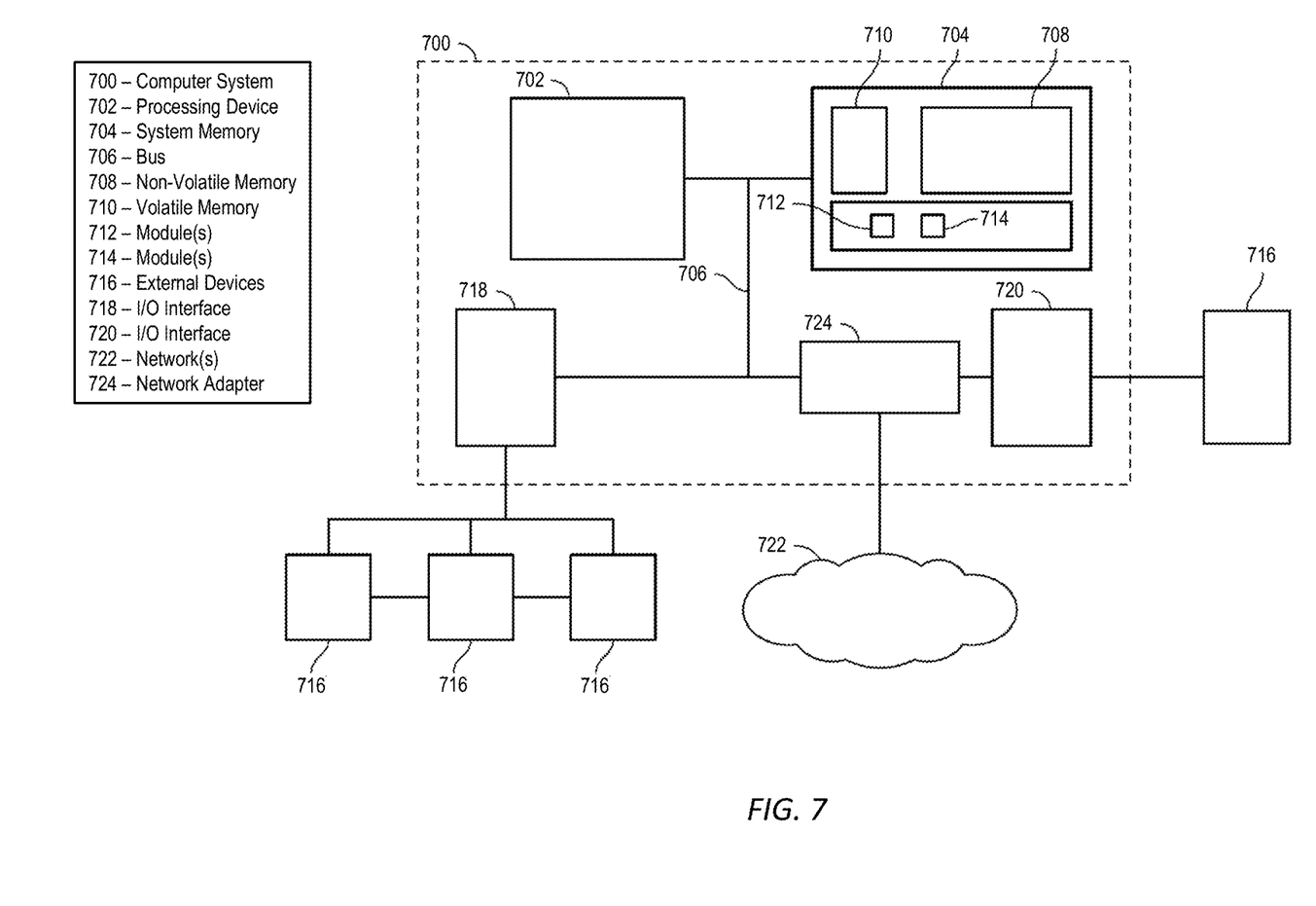
FIG. 7 depicts a block diagram of a computer system according to one or more embodiments.

FIG. 7 illustrates aspects of an embodiment of a computer system 700 that can perform various aspects of embodiments described herein. In some embodiments, the computer system(s) 700 can implement and/or otherwise be incorporated within or in combination with the SERP 100 described with respect to FIGS. 1 and 2. In some embodiments, a computer system 700 can be implemented server-side. For example, a computer system 700 can be configured to generate tagged search results as described previously herein.

The computer system 700 includes at least one processing device 702, which generally includes one or more processors or processing units for performing a variety of functions, such as, for example, completing or providing any portion of the SERP 100 (refer to FIGS. 1 and 2), the architecture 300 (refer to FIG. 3), the dynamic visual tagging system 400 (refer to FIG. 4), the tag list 500 (refer to FIG. 5), and/or the processes 600 and 650 for creating user-defined tags (refer to FIGS. 6A and 6B) an described previously herein. Components of the computer system 700 also include a system memory 704, and a bus 706 that couples various system components including the system memory 704 to the processing device 702. The system memory 704 may include a variety of computer system readable media. Such media can be any available media that is accessible by the processing device 702, and includes both volatile and non-volatile media, and removable and non-removable media. For example, the system memory 704 includes a non-volatile memory 708 such as a hard drive, and may also include a volatile memory 710, such as random access memory (RAM) and/or cache memory. The computer system 700 can further include other removable/non-removable, volatile/non-volatile computer system storage media.

The system memory 704 can include at least one program product having a set (e.g., at least one) of program modules that are configured to carry out functions of the embodiments described herein. For example, the system memory 704 stores various program modules that generally carry out the functions and/or methodologies of embodiments described herein. A module or modules 712, 714 may be included to perform functions related to the block diagrams 100, 200, 300, 400, and 500 as described previously herein. The computer system 700 is not so limited, as other modules may be included depending on the desired functionality of the computer system 700. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 702 can also be configured to communicate with one or more external devices 716 such as, for example, a keyboard, a pointing device, and/or any devices (e.g., a network card, a modem, etc.) that enable the processing device 702 to communicate with one or more other computing devices. Communication with various devices can occur via Input/Output (I/O) interfaces 718 and 720.

The processing device 702 may also communicate with one or more networks 722 such as a local area network (LAN), a general wide area network (WAN), a bus network and/or a public network (e.g., the Internet) via a network adapter 724. In some embodiments, the network adapter 724 is or includes an optical network adaptor for communication over an optical network. It should be understood that although not shown, other hardware and/or software components may be used in conjunction with the computer system 700. Examples include, but are not limited to, microcode, device drivers, redundant processing units, external disk drive arrays, RAID systems, and data archival storage systems, etc.

Figure 8:
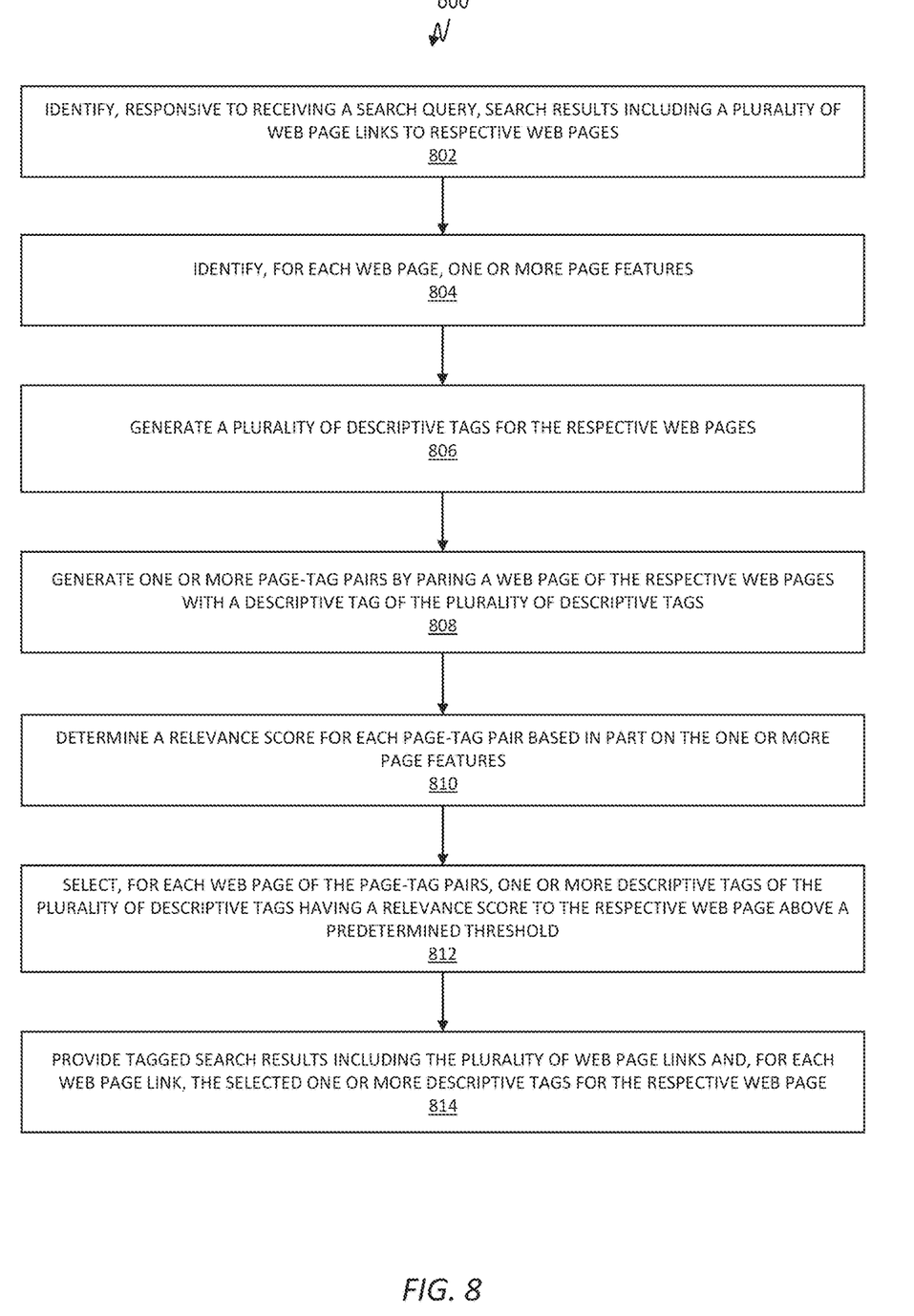
FIG. 8 depicts a flowchart of a method in accordance with one or more embodiments.

Referring now to FIG. 8, a flowchart 800 for dynamically building tagged search results in is generally shown according to an embodiment. The flowchart 800 is described with reference to FIGS. 1 to 7 and may include additional steps not depicted in FIG. 8. Although depicted in a particular order, the blocks depicted in FIG. 8 can be, in some embodiments, rearranged, subdivided, and/or combined.

At block 802, the method includes identifying, responsive to receiving a search query, search results. The search results include a plurality of web page links to respective web pages.

At block 804, the method includes identifying, for each web page, one or more page features.

At block 806, the method includes generating a plurality of descriptive tags for the respective web pages.

At block 808, the method includes generating one or more page-tag pairs by pairing a web page of the respective web pages with a descriptive tag of the plurality of descriptive tags.

At block 810, the method includes determining a relevance score for each page-tag pair.

At block 812, the method includes selecting one or more descriptive tags having a relevance score above a predetermined threshold.

At block 814, the method includes providing tagged search results that include the plurality of web page links and, for each web page link, the selected one or more descriptive tags for the respective web page.

In some embodiments, determining the relevance score for each page-tag pair includes leveraging a large language model to output, responsive to receiving an input including a respective page-tag pair, a relevance score.

In some embodiments, determining the relevance score for each page-tag pair further includes training a compact model to generate the relevance scores for each page-tag pair using the output from the large language model.

In some embodiments, identifying, for each web page, one or more page features includes extracting, prior to receiving the search query, the one or more page features from each respective web page, storing the extracted one or more page features in a database, and retrieving, after receiving the search query and from the database, the one or more page features.

In some embodiments, each of the descriptive tags includes an icon associated with a characteristic of the respective descriptive tag.

In some embodiments, the method includes, responsive to a user selecting a descriptive tag of the selected one or more descriptive tags, filtering the tagged search results to include only those web page links having the respective descriptive tag.

In some embodiments, a feature includes one or more of a textual content, a body text, a keyword, a number of images, a number of videos, a type, format, or dimension of an image or video, and a layout of text, images, or videos in a respective web page.

In some embodiments, the plurality of descriptive tags include one or more of an Image-Rich tag, a Video Content tag, a Scientific Facts tag, a Photography tag, a Scenic tag, a Recipes tag, a Kid Friendly tag, a Stories tag, and a Creative tag.

In some embodiments, the plurality of descriptive tags further include one or more user-defined tags.

In some embodiments, generating the one or more page-tag pairs further includes generating, for each respective web page, one or more feature-tag pairs.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
   identifying, responsive to receiving a search query, search results comprising a plurality of web page links to respective web pages;
   identifying, for each web page, one or more page features;
   generating a plurality of descriptive tags for the respective web pages;
   generating one or more page-tag pairs by pairing a web page of the respective web pages with a descriptive tag of the plurality of descriptive tags;
   determining a relevance score for each page-tag pair based in part on the one or more page features;

selecting, for each web page of the page-tag pairs, one or more descriptive tags of the plurality of descriptive tags having a relevance score to the respective web page above a predetermined threshold;

providing tagged search results comprising the plurality of web page links and, for each web page link, the selected one or more descriptive tags for the respective web page; and responsive to selection of a descriptive tag of the selected one or more descriptive tags, filtering the tagged search results to include only those web page links having the selected descriptive tag.

2. The method of claim 1, wherein determining the relevance score for each page-tag pair comprises leveraging a large language model to output, responsive to receiving an input comprising a respective page-tag pair, a relevance score.

3. The method of claim 2, wherein determining the relevance score for each page-tag pair further comprises training a compact model to generate the relevance scores for each page-tag pair using the output from the large language model.

4. The method of claim 1, wherein identifying, for each web page, one or more page features comprises:
extracting, prior to receiving the search query, the one or more page features from each respective web page;
storing the extracted one or more page features in a database; and
retrieving, after receiving the search query and from the database, the one or more page features.

5. The method of claim 1, wherein each of the descriptive tags includes an icon associated with a characteristic of the respective descriptive tag.

6. The method of claim 1, wherein a feature comprises one or more of a textual content, a body text, a keyword, a number of images, a number of videos, a type, format, or dimension of an image or video, and a layout of text, images, or videos in a respective web page.

7. The method of claim 1, wherein the plurality of descriptive tags comprise one or more of an Image-Rich tag, a Video Content tag, a Scientific Facts tag, a Photography tag, a Scenic tag, a Recipes tag, a Kid Friendly tag, a Stories tag, and a Creative tag.

8. The method of claim 7, wherein the plurality of descriptive tags further comprise one or more user-defined tags.

9. The method of claim 1, wherein generating the one or more page-tag pairs further comprises generating, for each respective web page, one or more feature-tag pairs.

10. A system comprising:
a user interface comprising a search bar, the user interface configured to display a search engine results page (SERP) responsive to receiving, in the search bar, a search query, the SERP comprising search results including one or more web page links to respective web pages; and
a compact model configured to modify the SERP, responsive to receiving the search results and a plurality of descriptive tags for the respective web pages, to include tagged search results;
wherein the tagged search results comprise, for each respective web page link in the search results, one or more descriptive tags of the plurality of descriptive tags; and
wherein the one or more descriptive tags can be selected, within the user interface, to filter the one or more web pages links in the SERP; and
wherein, responsive to selection of a descriptive tag of the one or more descriptive tags, the SERP is filtered to include only those web page links having the selected descriptive tag.

11. The system of claim 10, wherein the compact model is trained to determine a relevance score for a page-tag pair comprising a web page of the respective web pages and a descriptive tag of the plurality of descriptive tags.

12. The system of claim 11, further comprising a large language model configured to output relevance scores for a page-tag pairs.

13. The system of claim 11, wherein training the compact model to determine the relevance score for the page-tag pair comprises training the compact model to approximate a relevance score output from a large language model.

14. The system of claim 11, wherein modifying the SERP to include the tagged search results comprises selecting the N descriptive tags of the plurality of descriptive tags having the highest relevance scores.

15. The system of claim 10, further comprising a database configured to store one or more page features extracted from the respective web pages.

16. A system comprising:
a compact model trained to modify a search engine results page (SERP) to include, for each web page link in the SERP, one or more visual tags, wherein, responsive to selection of a visual tag, the SERP is filtered to include only those web page links having the selected visual tag;
a user interface configured to display the one or more visual tags, the user interface further configured to receive a description of a desired tag; and
a memory, computer readable instructions, and one or more processors for executing the computer readable instructions, the computer readable instructions controlling the one or more processors to perform operations comprising:
inputting, to the compact model, the description of the desired tag;
receiving, as output from the compact model, a new visual tag; and
adding the new visual tag to the displayed one or more visual tags.

17. The system of claim 16, further comprising a generative model, wherein the operations further comprise:
providing at least one of the new visual tag and the description of the desired tag as input to the generative model; and
receiving, as output from the generative model, an image for the new visual tag.

18. The system of claim 16, wherein the operations further comprise:
identifying, for one or more web pages, one or more page features; and
determining, for each of the one or more web pages, a relevance score for the new visual tag using the one or more page features.

* * * * *